United States Patent [19]
Rebmann

[11] 3,934,764
[45] Jan. 27, 1976

[54] APPARATUS FOR DOSING AND DISPENSING GRANULAR MATERIAL INTO CAPSULES

[75] Inventor: Manfred Rebmann, Hegnach, Germany

[73] Assignee: Robert Bosch G.m.b.H., Stuttgart, Germany

[22] Filed: July 3, 1974

[21] Appl. No.: 485,502

[30] Foreign Application Priority Data
July 5, 1973 Germany............................ 2334185

[52] U.S. Cl................................. 222/451; 141/238
[51] Int. Cl.².......................................... G01F 11/28
[58] Field of Search ........... 222/282, 305, 307, 308, 222/354, 355, 445, 446, 447, 450, 451; 141/237, 238

[56] References Cited
UNITED STATES PATENTS

| | | | |
|---|---|---|---|
| 1,891,038 | 12/1932 | Barros | 222/451 X |
| 3,341,088 | 9/1967 | Moynihan | 222/451 X |
| 3,718,164 | 2/1973 | Stewart | 141/238 X |

Primary Examiner—Stanley H. Tollberg
Assistant Examiner—Joseph J. Rolla
Attorney, Agent, or Firm—Edwin E. Greigg

[57] ABSTRACT

Apparatus for dispensing doses of granular material into capsules. The apparatus includes dosing chambers of variable geometry into which granules flow from a supply container. A multiple slide arrangement closes the inlet apertures of the dosing chambers before opening the outlet apertures thereof, and also temporarily enlarges the volumes of the dosing chambers to permit easy dispensing of the granular contents into the capsules.

12 Claims, 2 Drawing Figures

APPARATUS FOR DOSING AND DISPENSING GRANULAR MATERIAL INTO CAPSULES

BACKGROUND OF THE INVENTION

The invention relates to an apparatus for the dosing and dispensing of granular material, preferably granules having an approximately spherical shape, such as pellets or the like, into gelatin capsules with the aid of dosing chambers which are installed subsequent to a supply reservoir.

A multitude of devices for filling gelatin capsules with powder is known. An example of such devices is the one described in German Patent DT-PS No. 1,174,244 in which the capsule bottoms waiting to be filled are located in recesses within a rotating disc. During the cyclic rotation of this disc, the capsule bottoms first reach a filling station where the filling material drops into the capsule bottoms. In the next process step, the capsule bottoms are located directly under a tamping device whose tampers compress the powder contained in the capsule bottoms. The tamping process is followed by a renewed supply of powder which is again followed by tamping. This cycle is repeated until the capsule has been filled with the desired quantity of powder.

This method of filling, in which the air enclosed within the powder is displaced by tamping, is required for powder fills, but it cannot be used for the dosing and dispensing of granular material, particularly of pellets. This is the case because the pellets have a rigid core or may even be filled with fluid and would be compressed or destroyed by tamping. Furthermore, the nearly spherical granules do not enclose as much air as does powder.

Attempts have been made to dispense these pellets by the known slide-dosing principle, but these attempts have shown that even this known system is not really suitable for the dosing and dispensing of these pellets, because when the slide closes the associated dosing chamber, there is a possibility of slicing through one or more pellets.

OBJECT AND SUMMARY OF THE INVENTION

It is an object of the invention to provide an apparatus for the dosing and dispensing of granular material, preferably granules of approximately spherical shape, such as pellets or the like, into hard gelatin capsules, where the apparatus permits precise and troublefree dosing with the gentlest possible treatment of the fill-up material.

This object is attained, according to the invention, by the provision of an apparatus including a separating member, located between a material supply container and a dosing chamber, and a slide which is located in the dispensing region and serves for opening and closing the dosing chamber. The slide is provided with penetrations and also recesses which enlarge the dosing chambers during the dispensing of material into capsules. The separating member is located between the supply container and the dosing chamber and is connected to the slide provided for opening and closing the outlet apertures of the dosing chambers. The separating member is embodied as a foil and its thickness is smaller than the diameter of the smallest granule contained in the container. In addition, the apparatus is so designed that the dosing chambers have a generally trapezoidal cross section which can be changed to a triangular cross section. The alteration of the cross section of the dosing chamber and, hence, the alteration of the dosage volume is performed by one central adjustment mechanism which affects all dosing chambers in the apparatus.

The separating foil is disposed between the supply container and the dosing chambers and it has openings whose size corresponds to the largest setting of the dosing chamber which insures that after the pellets have dribbled into the dosing chamber, this separating foil can slide without destroying any pellets. Any individual pellets which may be located within the path of the separating foil are either pushed back into the supply container or else are pressed down into the associated dosing chamber.

The separating foil is connected to the slide which opens and closes the outlet apertures of the dosing chamber. Furthermore, the openings in the separating foil are offset from the apertures in the lower slide and from the recesses in the lower slide which expand the dosing chambers by forming relief chambers. For these two reasons the dosing chambers are opened only after the separating foil has closed the upper inlet aperture.

During the dispensing of filling material into the capsules, the dosing chambers are enlarged by the recesses in the lower slide which mate with the dosing chambers guaranteeing rapid and reliable emptying of the dosing chamber even when the filling material has been slightly stressed because a few pellets may have been forced into the dosing chambers during the closure of the separating foil.

The invention will be now described in detail with the aid of the accompanying drawing.

DESCRIPTION OF THE PREFERRED EMBODIMENT

Figure 1:
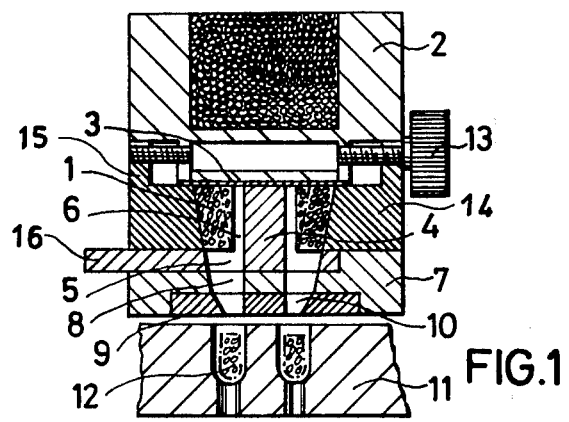
FIG. 1 is a vertical cross section through the dosing and dispensing apparatus of the invention.

FIG. 1 shows a supply container 2, holding the granular material to be dosed which consists of granules of approximately spherical shape, for example pellets or the like. Located beneath the supply container 2 are dosing chambers 1 and a separating foil 3 whose purpose it is, to close off the tops of the dosing chambers 1 after the filling material has dropped into the dosing chambers 1. A slide 4 is disposed below the separating foil 3. The slide 4 has penetrations 5 and recesses 6 which serve as relief chambers for the dosing chambers 1 when the slide is so positioned that the recesses 6 lie opposite the dosing chambers 1. The slide 4 is guided within a housing 7 which has openings 8 whose dimension corresponds to the size of the penetrations 5 within slide 4. The housing 7 further contains an interchangeable plate 9 with penetrations 10 whose outlet diameter is adapted to the diameter of the particular type of gelatin capsule to be filled up. The entire dosing and dispensing apparatus is located above a rotating disc 11 which contains the hard gelatin capsules 12 to be filled.

The cross-section of the dosing chambers 1 may be altered from a trapezoidal shape to a triangular shape and this fact is indicated in FIG. 1 with broken lines. This adjustment is performed by a central adjusting mechanism which may be of known type and is suggested in FIGS. 1 and 2 by the knurled knob 13. The mechanism activated by the knob 13 causes blocks 14 and 15 to slide in and out relative to the slide 4.

Figure 2:
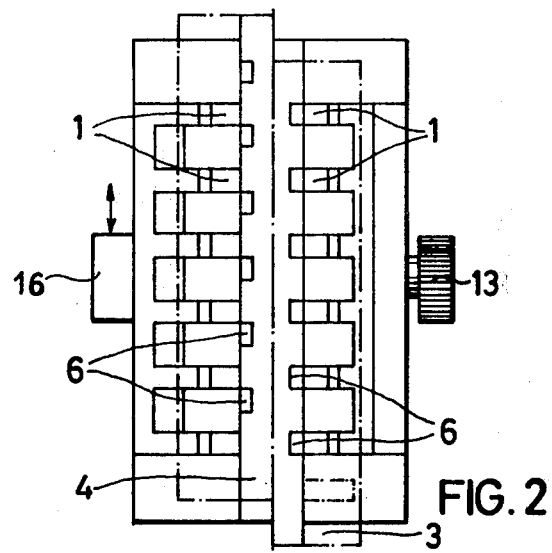
FIG. 2 is a top view of selected members of the apparatus depicted in FIG. 1, in two different, relative positions.

FIG. 2 represents two different operational settings of selected elements of the apparatus. The left half of FIG. 1 shows the dosing chambers 1, the slide 4 and the separating foil 3 during the filling process whereas the right side of FIG. 2 shows the dosing chambers 1, the slide 4 and the separating foil 3 during the emptying process which dispenses their contents into the capsules below.

The two operational settings are achieved by the simultaneous displacement of the slide 4 and the separating foil 3. By moving the slide 4, as shown on the right hand side of FIG. 2, the recesses 6 register with the dosing chambers 1 and permit passage of the contents of the dosing chambers 1 down through the penetrations 5, the openings 8 and the penetrations 10 into the capsules 12. At the same time, the separating foil 3 has been moved due to its connection to the slide 4 to close the passage from the supply container 2 to the dosing chambers 1. Movement of the slide 4 and the separating foil 3 is accomplished by displacing a tab extension 16 of the slide 4 in a known manner in the direction shown by the arrows in FIG. 2.

The adjustment of the shape of the dosage chambers, i.e., of the trapezoidal or triangular cross-section, permits precise dosing and this precision is maintained even when the volume of the dosing chambers 1 becomes extremely small. This brings the further advantage that, even when the dispensing volume is extremely small, the upper inlet aperture of the dosing chambers 1 is still relatively large.

What is claimed is:

1. In an apparatus for dosing material, especially granular material, and dispensing doses of said material into capsules, including a housing having a supply container for the granular material and a plurality of dosing chambers for receiving said granular material formed therein, said dosing chambers each having inlet and outlet apertures, the improvement comprising:
   first slide means mounted within said housing, said first slide means separating said supply container from said plurality of dosing chambers and controlling in its movement opening and closing of the inlet apertures of said dosing chambers; and
   second slide means mounted within said housing, said second slide means including penetrations and recesses which adjoin said dosing chambers, said recesses being disposed laterally of the dosing chambers and their respective penetrations, said second slide means controlling in its movement opening and closing of the outlet apertures of said dosing chambers with said penetrations and increasing the effective volume of said dosing chambers with said recesses to aid in dispensing the material therefrom.

2. A dosing and dispensing apparatus as defined in claim 1, wherein said second slide means is operatively coupled to said first slide means.

3. A dosing and dispensing apparatus as defined in claim 2, wherein said first slide means comprises a metal foil whose thickness is less than the granular material to be dosed and dispensed into the capsules.

4. A dosing and dispensing apparatus as defined in claim 3, further comprising third slide means which produces as a result of its movement a variation in the vertical cross-section of said dosing chambers which is between trapezoidal and triangular.

5. A dosing and dispensing apparatus as defined in claim 4, further comprising a central adjustment mechanism mounted to said housing for controlling the movement of said third slide means, thereby changing the volume of all said dosing chambers.

6. A dosing and dispensing apparatus as defined in claim 2, further comprising third slide means which produces as a result of its movement a variation in the vertical cross-section of said dosing chambers which is between trapezoidal and triangular.

7. A dosing and dispensing apparatus as defined in claim 6, further comprising a central adjustment mechanism mounted to said housing for controlling the movement of said third slide means, thereby changing the volume of all said dosing chambers.

8. A dosing and dispensing apparatus as defined in claim 1, wherein said first slide means comprises a metal foil whose thickness is less than the granular material to be dosed and dispensed into the capsules.

9. A dosing and dispensing apparatus as defined in claim 8, further comprising third slide means which produces as a result of its movement a variation in the vertical cross-section of said dosing chambers which is between trapezoidal and triangular.

10. A dosing and dispensing apparatus as defined in claim 9, further comprising a central adjustment mechanism mounted to said housing for controlling the movement of said third slide means, thereby changing the volume of all said dosing chambers.

11. A dosing and dispensing apparatus as defined in claim 1, further comprising third slide means which produces as a result of its movement a variation in the vertical cross-section of said dosing chambers which is between trapezoidal and triangular.

12. A dosing and dispensing apparatus as defined in claim 11, further comprising a central adjustment mechanism mounted to said housing for controlling the movement of said third slide means, thereby changing the volume of all said dosing chambers.

* * * * *